(12) United States Patent
Kim

(10) Patent No.: US 12,384,425 B2
(45) Date of Patent: Aug. 12, 2025

(54) CONTROL METHOD DURING SWITCHING TO MANUAL DRIVING MODE OF AUTONOMOUS VEHICLE EQUIPPED WITH HAPTIC PEDAL

(71) Applicants: Hyundai Motor Company, Seoul (KR); Kia Corporation, Seoul (KR)

(72) Inventor: Eun Sik Kim, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 269 days.

(21) Appl. No.: 18/135,546

(22) Filed: Apr. 17, 2023

(65) Prior Publication Data

US 2024/0174267 A1    May 30, 2024

(30) Foreign Application Priority Data

Nov. 30, 2022    (KR) ........................ 10-2022-0164826

(51) Int. Cl.
    *B60W 60/00*          (2020.01)
    *B60W 50/08*          (2020.01)
    *B60W 50/16*          (2020.01)

(52) U.S. Cl.
CPC ...... *B60W 60/0053* (2020.02); *B60W 50/082* (2013.01); *B60W 50/16* (2013.01); *B60W 2540/10* (2013.01); *B60W 2540/12* (2013.01)

(58) Field of Classification Search
CPC ........... B60W 60/0053; B60W 50/082; B60W 50/16; B60W 2540/10; B60W 2540/12
See application file for complete search history.

(56) References Cited

U.S. PATENT DOCUMENTS

| | | | |
|---|---|---|---|
| 2016/0325757 A1* | 11/2016 | Westlund | G05D 1/0061 |
| 2018/0186374 A1 | 7/2018 | Ando et al. | |
| 2018/0373244 A1* | 12/2018 | Augst | B60W 30/10 |
| 2019/0202460 A1 | 7/2019 | Ishikawa et al. | |
| 2023/0339516 A1* | 10/2023 | Mccready | B60W 60/0061 |

FOREIGN PATENT DOCUMENTS

| | | |
|---|---|---|
| JP | 2003-320868 | 11/2003 |
| JP | 5992626 | 8/2016 |
| KR | 10-2013-0042150 | 4/2013 |

(Continued)

OTHER PUBLICATIONS

English Translation of CN109849920A Author: Kim Eun Sik Title: Method and Device for Controlling Driving Mode of Autonomous Vehicle Date: Jun. 7, 2019 (Year: 2019).*

(Continued)

*Primary Examiner* — James J Lee
*Assistant Examiner* — Steven Vu Nguyen
(74) *Attorney, Agent, or Firm* — MORGAN, LEWIS & BOCKIUS LLP

(57) ABSTRACT

In a control method during switching to a manual driving mode of an autonomous vehicle provided with a haptic pedal, when the autonomous vehicle provided with the haptic pedal is switched from an autonomous driving mode to the manual driving mode, a mode change signal is generated to switch to the manual driving mode, and switching to the manual driving mode is performed after the brake pedal is pressed. It is possible to prevent accidents as much as possible through strengthening of safety.

9 Claims, 4 Drawing Sheets

(56) References Cited

FOREIGN PATENT DOCUMENTS

| KR | 10-2015-0128041 | 11/2015 |
| KR | 10-2017-0137427 | 12/2017 |
| KR | 10-2022-0022264 | 2/2022 |

OTHER PUBLICATIONS

English Translation of KR20150064041A Author: Sieber et al. Title: Method and Control Unit for Controlling a Haptic Accelerator Pedal of a Motor Vehicle Having a Simulated Detent Function (Year: 2015). Date: Jun. 10, 2015 (Year: 2015).*

English Translation of JP2022022075A Author: Ito et al. Title: Vehicle Control Device and Vehicle Control Method Date: Feb. 3, 2022 (Year: 2022).*

* cited by examiner

CONTROL METHOD DURING SWITCHING TO MANUAL DRIVING MODE OF AUTONOMOUS VEHICLE EQUIPPED WITH HAPTIC PEDAL

CROSS-REFERENCE TO THE RELATED APPLICATION

The present application claims priority to Korean Patent Application No. 10-2022-0164826, filed on Nov. 30, 2022, the entire contents of which is incorporated herein for all purposes by this reference.

BACKGROUND OF THE PRESENT DISCLOSURE

Field of the Present Disclosure

The present disclosure relates to a control method during switching to a manual driving mode of an autonomous vehicle provided with a haptic pedal, and more particularly to a control method related to change of a driving mode and generation of a haptic signal of a pedal when switching from an autonomous driving mode to a manual driving mode.

Description of Related Art

An autonomous vehicle is a smart vehicle incorporating autonomous driving technology for automatically reaching a destination without a driver directly operating a steering wheel, an accelerator pedal, a brake pedal, etc.

When autonomous driving is universally realized, it is possible to select an autonomous driving mode in which a vehicle automatically drives to a destination without the driver directly driving the vehicle and a manual driving mode in which the driver directly drives the vehicle.

In the autonomous driving mode, the driver does not need to operate the pedals (accelerator pedal and brake pedal) provided in the vehicle, and thus may comfortably take a break while driving.

Meanwhile, when the autonomous driving mode is changed to the manual driving mode, if safety is not strengthened, a risk of an accident increases, and thus various solutions thereto are needed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing accidents as much as possible through strengthening of safety using a control method related to change of a driving mode and generation of a haptic signal of a pedal when an autonomous vehicle provided with a haptic pedal switches from an autonomous driving mode to a manual driving mode.

In accordance with an aspect of the present disclosure, the above and other objects may be accomplished by the provision of a control method during switching to a manual driving mode of an autonomous vehicle provided with a haptic pedal, the control method including determining, by a controller, whether a manual driving mode signal is generated in an autonomous driving situation, determining whether a brake pedal operation signal is generated when the controller concludes that the manual driving mode signal is generated in the determining of whether the manual driving mode signal is generated, switching to the manual driving mode when the controller concludes that the brake pedal operation signal is generated in the determining of whether the brake pedal operation signal is generated, and continuously maintaining a current autonomous driving mode of the vehicle when the controller concludes that the brake pedal operation signal is not generated in the determining of whether the brake pedal operation signal is generated.

The control method may further include generating a welcome haptic signal in a brake pedal of the vehicle before the switching to the manual driving mode, in which the switching to the manual driving mode may be performed after the welcome haptic signal is generated.

An accelerator pedal haptic signal or a brake pedal haptic signal may be generated when the controller receives operation signal of an accelerator pedal of the vehicle or the brake pedal in a manual driving mode situation of the vehicle after the switching to the manual driving mode.

Signal strength of each of the accelerator pedal haptic signal and the brake pedal haptic signal may gradually increase according to an amount of operation of the accelerator pedal and the brake pedal.

The welcome haptic signal, the accelerator pedal haptic signal, and the brake pedal haptic signal may have different signal types and strengths.

The control method may further include determining whether the brake pedal operation signal is generated when the controller concludes that the manual driving mode signal is not generated in the determining of whether the manual driving mode signal is generated, and determining whether an operation duration of the brake pedal is greater than or equal to a predetermined time period when the controller concludes that the brake pedal operation signal is generated in the determining of whether the brake pedal operation signal is generated, in which, when the controller concludes that the operation duration of the brake pedal is greater than or equal to the predetermined time period in the determining of whether the operation duration of the brake pedal is greater than or equal to the predetermined time period, performing the generating of the welcome haptic signal to proceed with a subsequent step thereof.

When the controller concludes that the brake pedal operation signal is not generated in the determining of whether the brake pedal operation signal is generated, the logic may be fed back to the continuously maintaining the current autonomous driving mode to continuously maintain the autonomous driving mode.

When the controller concludes that the operation duration of the brake pedal is less than the predetermined time period in the determining of whether the operation duration of the brake pedal is greater than or equal to the predetermined time period, the logic may be fed back to the continuously maintaining the current autonomous driving mode to continuously maintain the autonomous driving mode.

In accordance with another aspect of the present disclosure, there is provided a control method during switching to a manual driving mode of an autonomous vehicle provided with a haptic pedal, the control method including determining whether a manual driving mode signal is generated in an autonomous driving situation, determining whether a brake pedal operation signal is generated when the controller concludes that the manual driving mode signal is not generated in the determining of whether the manual driving mode signal is generated, continuously maintaining a current autonomous driving mode of the vehicle when the controller concludes that the brake pedal operation signal is not generated in the determining of whether the brake pedal operation signal is generated, determining whether an operation duration of a brake pedal in the vehicle is greater than or equal to a predetermined time period when the controller concludes that the brake pedal operation signal is generated in the determining of whether the brake pedal operation signal is generated, and generating a warning haptic signal in the brake pedal when the controller concludes that the operation duration of the brake pedal is greater than or equal to the predetermined time period in the determining of whether the operation duration of the brake pedal is greater than or equal to the predetermined time period, in which a logic after the generating of the warning haptic signal is fed back to the determining of whether the manual driving mode signal is generated.

When the controller concludes that the operation duration of the brake pedal is less than the predetermined time period in the determining of whether the operation duration of the brake pedal is greater than or equal to the predetermined time period, the logic may be fed back to the continuously maintaining the current autonomous driving mode to continuously maintain the autonomous driving mode.

The control method may further include determining whether the brake pedal operation signal is generated when the controller concludes that the manual driving mode signal is generated in the determining of whether the manual driving mode signal is generated, and switching to a manual driving mode when the controller concludes that the brake pedal operation signal is generated in the determining of whether the brake pedal operation signal is generated.

When the controller concludes that the brake pedal operation signal is not generated in the determining of whether the brake pedal operation signal is generated, the logic may be fed back to the continuously maintaining the current autonomous driving mode to continuously maintain the autonomous driving mode.

The control method may further include generating a welcome haptic signal in the brake pedal before the switching to the manual driving mode, in which the switching to the manual driving mode is performed after the welcome haptic signal is generated.

An accelerator pedal haptic signal or a brake pedal haptic signal may be generated when the controller receives operation signal of an accelerator pedal of the vehicle or the brake pedal in a manual driving mode situation of the vehicle after the switching to the manual driving mode.

Signal strength of each of the accelerator pedal haptic signal and the brake pedal haptic signal may gradually increase according to an amount of operation of the accelerator pedal and the brake pedal.

The warning haptic signal, the welcome haptic signal, the accelerator pedal haptic signal, and the brake pedal haptic signal may have different signal types and strengths.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
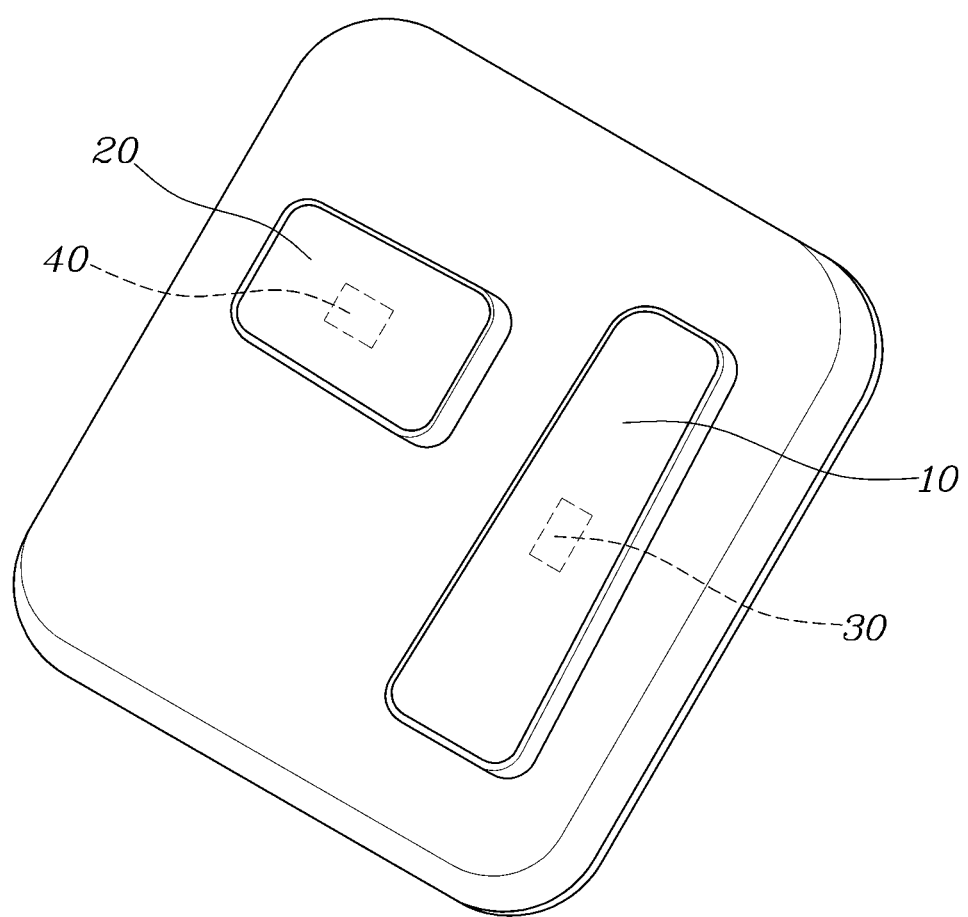
FIG. 1 is a diagram of an accelerator pedal provided with an accelerator pedal haptic motor and a brake pedal provided with a brake pedal haptic motor according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings, and the same or similar elements will be provided the same reference numerals regardless of reference symbols, and redundant description thereof will be omitted.

The suffixes "module" and "unit" for components used in the following description are provided or used together in consideration of ease of generating the specification, and do not have meanings or roles distinct from each other.

In describing the exemplary embodiments included in the present specification, when it is determined that a detailed description of related publicly known technology may obscure the gist of the exemplary embodiments included in the present specification, the detailed description thereof will be omitted.

Furthermore, it should be understood that the accompanying drawings are only for easy understanding of the exemplary embodiments included in the present specification, the technical idea included in the present specification is not limited by the accompanying drawings, and the present disclosure includes all modifications, equivalents, and substitutes included in the spirit and scope of the present disclosure.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween.

In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, or combinations thereof described in the specification are present, and does not preclude the possibility of addition or presence of one or more other features, numbers, steps, operations, elements, parts, or combinations thereof.

Furthermore, a unit or control unit included in names such as a motor control unit (MCU) and a hybrid control unit (HCU) is a term widely used for naming controllers for controlling a vehicle-specific function, and does not mean a generic functional unit.

A controller may include a communication device that communicates with another controller or a sensor to control a function assigned thereto, a memory that stores an operating system, a logic command, input/output information, etc., and one or more processors that perform calculation, determination, decision, etc. necessary for controlling a function assigned thereto.

Hereinafter, a control method during switching to a manual driving mode of an autonomous vehicle provided with a haptic pedal according to various exemplary embodiments of the present disclosure will be described with reference to the accompanying drawings.

As illustrated in FIG. 1, an autonomous vehicle is provided with an accelerator pedal 10 and a brake pedal 20 operated by a driver, and the accelerator pedal 10 and the brake pedal 20 are provided with an accelerator pedal haptic motor 30 and a brake pedal haptic motor 40, respectively, each providing a haptic signal to a driver.

The accelerator pedal haptic motor 30 and the brake pedal haptic motor 40 are disposed at a central portion of the accelerator pedal 10 and a central portion of the brake pedal 20, respectively, so that the haptic signal may be uniformly transmitted to the entire pedal during operation.

The haptic motor operates and provides a haptic signal to the driver when the driver operates the pedal, in case of an emergency, or in an erroneous operation situation, and the driver may more easily recognize the corresponding situation through the haptic signal.

The autonomous vehicle may select a manual driving mode in which the driver directly drives the vehicle and an autonomous driving mode in which the vehicle automatically drives to the destination without the driver directly driving the vehicle.

Figure 2:
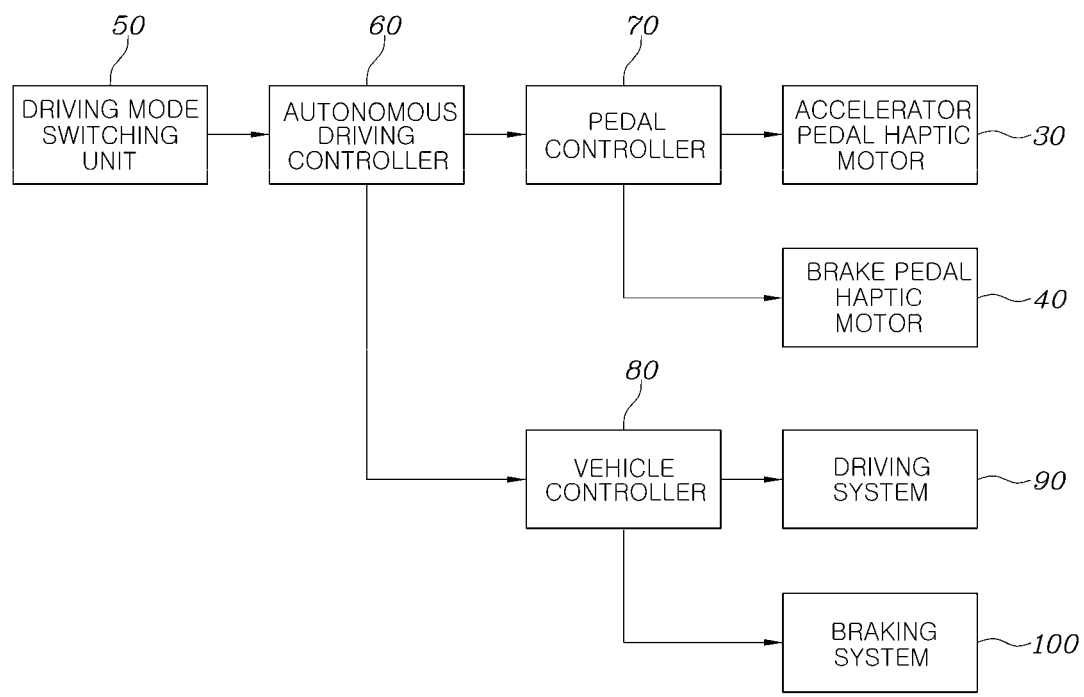
FIG. 2 is a schematic block diagram for describing a control method according to an exemplary embodiment of the present disclosure.

As illustrated in FIG. 2, the driver may select the autonomous driving mode and the manual driving mode of the vehicle by operating a driving mode switching unit 50.

The driving mode switching unit 50 may include a switch, a button, or a dial operated by the driver to generate an autonomous driving mode signal and a manual driving mode signal to switch from the autonomous driving mode to the manual driving mode or from the manual driving mode to the autonomous driving mode.

The driving mode switching unit 50 may be provided around a driver seat for easy operation by the driver, and may be configured to be positioned on a seat as needed in the autonomous vehicle.

A signal of the driving mode switching unit 50 may be transmitted to an autonomous driving controller 60 of the vehicle, the autonomous driving controller 60 may transmit a control signal to a pedal controller 70, and the accelerator pedal haptic motor 30 and the brake pedal haptic motor 40 may operate under the control of the pedal controller 70.

Furthermore, the autonomous driving controller 60 may transmit a control signal to a vehicle controller 80, and the vehicle controller 80 may transmit a control signal to a driving system 90 and a braking system 100 of the vehicle to accelerate or brake the vehicle.

Figure 3:
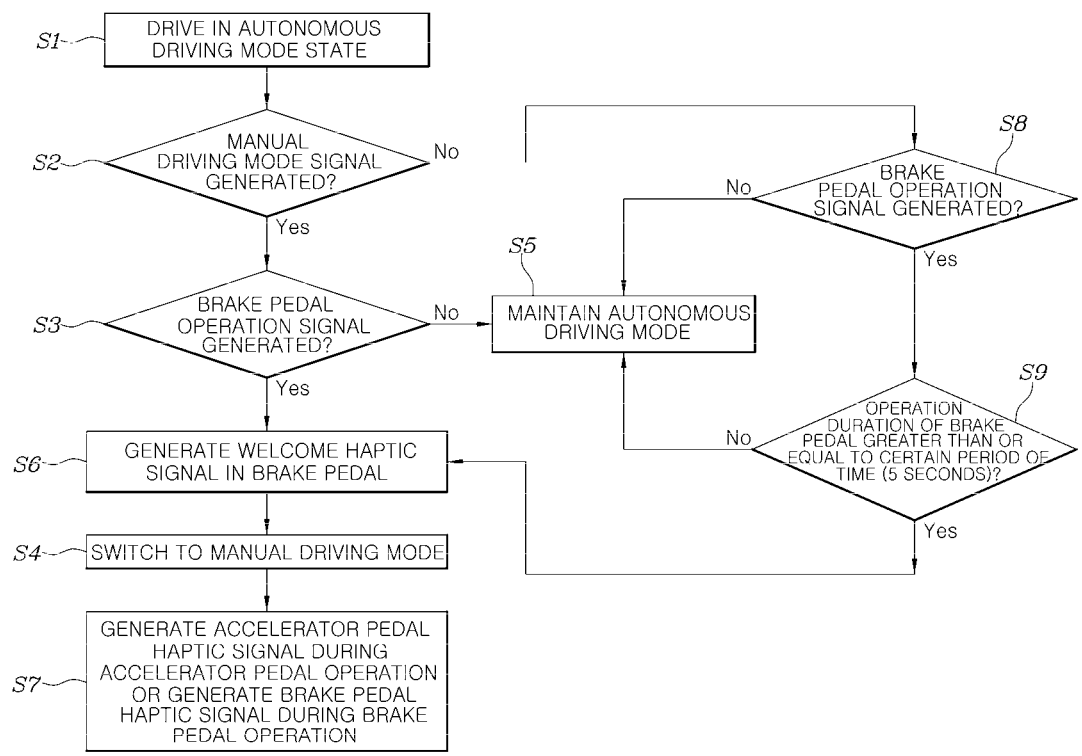
FIG. 3 is a flowchart for describing a control method of various exemplary embodiments according to an exemplary embodiment of the present disclosure.

As illustrated in FIG. 3, a control method according to an exemplary embodiment of the present disclosure includes a first step (S2) of determining whether a manual driving mode signal is generated in an autonomous driving situation (S1), a second step (S3) of determining whether a brake pedal 20 operation signal is generated upon determining that the manual driving mode signal is generated in the first step (S2), a third step (S4) of switching to the manual driving mode upon determining that the brake pedal 20 operation signal is generated in the second step (S3), and a fourth step (S5) of continuously maintaining the current autonomous driving mode upon determining that the brake pedal 20 operation signal is not generated (when only the accelerator pedal is operated or both the accelerator pedal and the brake pedal are not operated) in the second step (S3).

Meanwhile, in a process from the second step (S3) to the third step (S4), a step (S6) of generating a welcome haptic signal in the brake pedal 20 is further included before the third step (S4), and the third step (S4) proceeds after the welcome haptic signal is generated in the brake pedal 20.

The welcome haptic signal of the brake pedal 20 is a tactile signal for giving an alarm to inform the driver that mode transition from the autonomous driving mode to the manual driving mode is proceeding normally, and may be, for example, a signal of weak strength continuously generated twice in a short period.

A step (S7) of generating an accelerator pedal haptic signal or a brake pedal haptic signal is performed when the driver operates the accelerator pedal 10 or the brake pedal 20 in a manual driving mode situation of the vehicle after the third step (S4).

When the accelerator pedal 10 is operated, the accelerator pedal haptic motor 30 operates to generate an accelerator pedal haptic signal in the accelerator pedal 10. When the brake pedal 20 is operated, the brake pedal haptic motor 40 operates to generate a brake pedal haptic signal in the brake pedal 20.

The strength of each of the accelerator pedal haptic signal and the brake pedal haptic signal gradually increases according to the amount of operation of the pedal, and in the present way, the driver may easily recognize the amount of operation of the pedal through the haptic signal having increased strength.

Furthermore, the welcome haptic signal, the accelerator pedal haptic signal, and the brake pedal haptic signal have different signal types and strengths, and in the present way, erroneous operation may be prevented as much as possible.

The control method according to an exemplary embodiment of the present disclosure further includes a fifth step (S8) of determining whether a brake pedal 20 operation signal is generated upon determining that the manual driving mode signal is not generated in the first step (S2), and a sixth step (S9) of determining whether an operation duration of the brake pedal 20 is greater than or equal to a predetermined time period (5 seconds) upon determining that the brake pedal 20 operation signal is generated in the fifth step (S8).

Upon determining that the operation duration of the brake pedal 20 is greater than or equal to a predetermined time period (5 seconds) in the sixth step (S9), logic according to an exemplary embodiment of the present disclosure is fed back to the step (S6) of generating the welcome haptic signal to proceed with a subsequent step.

A situation in which the logic according to an exemplary embodiment of the present disclosure is fed back from the sixth step (S9) to the step (S6) is a situation in which the driver does not operate the driving mode switching unit 50 by mistake or due to panic when mode transition from the autonomous driving mode to the manual driving mode is necessary, so that a manual driving mode signal is not generated, and the brake pedal 20 is continuously operated for a predetermined time period (5 seconds) or more to generate a brake pedal signal. At the instant time, it is determined that manual driving is urgently required, and the driving mode is switched to the manual driving mode under the control of the autonomous driving controller 60 of the vehicle.

On the other hand, upon determining that the brake pedal 20 operation signal is not generated in the fifth step (S8) (when only the accelerator pedal is operated or the accelerator pedal and the brake pedal are not operated), the logic is fed back to the fourth step (S5) so that the vehicle continues to maintain the autonomous driving mode.

Furthermore, upon determining that the operation duration of the brake pedal 20 is less than the predetermined time period (5 seconds) (when it is determined to be an erroneous operation) in the sixth step (S9), the logic is fed back to the fourth step (S5) so that the vehicle continues to maintain the autonomous driving mode.

Figure 4:
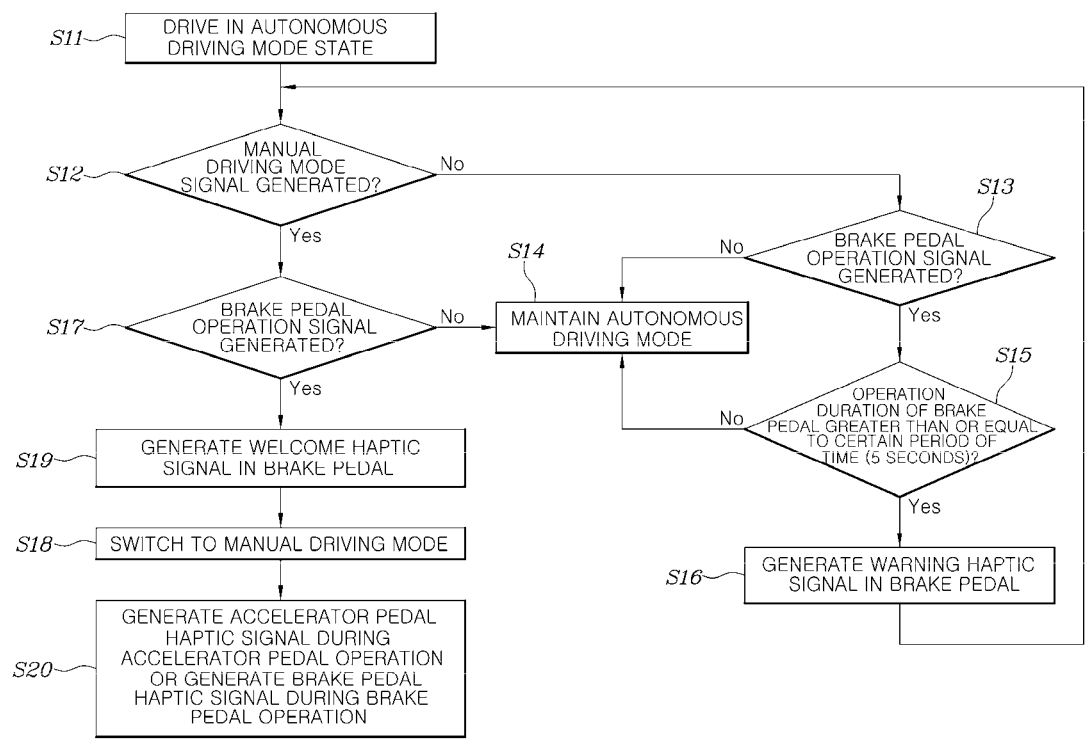
FIG. 4 is a flowchart for describing a control method of various exemplary embodiments according to an exemplary embodiment of the present disclosure.

As illustrated in FIG. 4, a control method according to an exemplary embodiment of the present disclosure includes a first step (S12) of determining whether a manual driving mode signal is generated in an autonomous driving situation (S11), a second step (S13) of determining whether a brake pedal 20 operation signal is generated upon determining that the manual driving mode signal is not generated in the first step (S12), a third step (S14) of continuously maintaining a current autonomous driving mode upon determining that the brake pedal 20 operation signal is not generated (when only the accelerator pedal is operated or both the accelerator pedal and the brake pedal are not operated) in the second step (S13), a fourth step (S15) of determining whether the operation duration of the brake pedal 20 is greater than or equal to the predetermined time period (5 seconds) upon determining that the brake pedal 20 operation signal is generated in the second step (S13), and a fifth step (S16) of generating a warning haptic signal in the brake pedal 20 upon determining that the operation duration of the brake pedal 20 is greater than or equal to the predetermined time period (5 seconds).

A situation in which the warning haptic signal is generated in the brake pedal 20 in the fifth step (S16) is a situation in which the driver does not operate the driving mode switching unit 50 so that the manual driving mode signal is not generated, and continuously operates the brake pedal 20 for the predetermined time period (5 seconds) or more so that the brake pedal signal is generated. At the instant time, it is determined that the driver performs erroneous operation so that the driver is warned of erroneous operation by generating a warning haptic signal in the brake pedal 20 while maintaining the driving mode in the autonomous driving mode under the control of the autonomous driving controller 60 of the vehicle.

The warning haptic signal in the brake pedal 20 may be, for example, a signal of strong strength continuously generated once or more than once in a short period.

After the fifth step (S16), the logic of the present disclosure is fed back to the first step (S12) to proceed with a subsequent step.

Furthermore, upon determining that the operation duration of the brake pedal 20 is less than the predetermined time period (5 seconds) in the fourth step (S15) (in the case of erroneous operation), the logic of the present disclosure is fed back to the third step (S14) so that the vehicle continues to maintain the autonomous driving mode.

The logic according to an exemplary embodiment of the present disclosure further includes a sixth step (S17) of determining whether a brake pedal 20 operation signal is generated upon determining that the manual driving mode signal is generated in the first step (S12), and a seventh step (S18) of switching to the manual driving mode upon determining that the brake pedal 20 operation signal is generated in the sixth step (S17).

Upon determining that the brake pedal 20 operation signal is not generated (when only the accelerator pedal is operated or both the accelerator pedal and the brake pedal are not operated) in the sixth step (S17), the logic of the present disclosure is fed back to the third step (S14) to continuously maintain the current autonomous driving mode.

Meanwhile, a step (S19) of generating a welcome haptic signal in the brake pedal 20 is further included before the seventh step (S18) in a process from the sixth step (S17) to the seventh step (S18), and the seventh step (S18) is performed after the welcome haptic signal is generated in the brake pedal 20.

The welcome haptic signal of the brake pedal 20 is a tactile signal for giving an alarm to inform the driver that mode transition from the autonomous driving mode to the manual driving mode is proceeding normally, and may be, for example, a signal of weak strength continuously generated twice in a short period.

After the seventh step (S18), a step (S20) is performed to generate an accelerator pedal haptic signal or a brake pedal haptic signal when the driver operates the accelerator pedal 10 or brake pedal 20 in the manual driving mode situation.

When the accelerator pedal 10 is operated, the accelerator pedal haptic motor 30 operates to generate an accelerator pedal haptic signal in the accelerator pedal 10. When the brake pedal 20 is operated, the brake pedal haptic motor 40 operates to generate a brake pedal haptic signal in the brake pedal 20.

The strength of each of the accelerator pedal haptic signal and the brake pedal haptic signal gradually increases according to the amount of operation of the pedal, and in the present way, the driver may easily recognize the amount of operation of the pedal through the haptic signal having increased strength.

Furthermore, the welcome haptic signal, the accelerator pedal haptic signal, and the brake pedal haptic signal have different signal types and strengths, and in the present way, erroneous operation may be prevented as much as possible.

The logic of the various exemplary embodiments (see FIG. 3) and the logic of the various exemplary embodiments (see FIG. 4) according to an exemplary embodiment of the present disclosure are allowed to be selectively selected and used by the driver as necessary using a display device such as an AVN.

As described above, the exemplary embodiment of the present disclosure is a control method related to change of the driving mode and generation of the haptic signal of the pedal when the autonomous vehicle provided with the haptic pedal switches from the autonomous driving mode to the manual driving mode, and has an advantage of preventing accidents as much as possible through strengthening of safety.

Furthermore, the exemplary embodiment of the present disclosure has an advantage of greatly improving safety when changing to the manual driving mode since the driving mode is switched to the manual driving mode when a mode change signal is generated to switch from the autonomous driving mode to the manual driving mode, and the brake pedal 20 is pressed.

The exemplary embodiment of the present disclosure is a control method related to change of the driving mode and generation of the haptic signal of the pedal when the autonomous vehicle provided with the haptic pedal switches from the autonomous driving mode to the manual driving mode, and has an effect of preventing accidents as much as possible through strengthening of safety.

Furthermore, the exemplary embodiment of the present disclosure has an effect of greatly improving safety when changing to the manual driving mode since the driving mode is switched to the manual driving mode when a mode change signal is generated to switch from the autonomous driving mode to the manual driving mode, and the brake pedal is pressed.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the control method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control method during switching to a manual driving mode of a vehicle provided with a haptic pedal, the control method comprising:
   determining, by a controller, whether a manual driving mode signal is generated in an autonomous driving situation of the vehicle;
   determining, by the controller, whether a brake pedal operation signal is generated when the controller concludes that the manual driving mode signal is not generated in the determining of whether the manual driving mode signal is generated;
   continuously maintaining a current autonomous driving mode of the vehicle when the controller concludes that the brake pedal operation signal is not generated in the determining of whether the brake pedal operation signal is generated;

determining, by the controller, whether an operation duration of a brake pedal in the vehicle is greater than or equal to a predetermined time period when the controller concludes that the brake pedal operation signal is generated in the determining of whether the brake pedal operation signal is generated; and generating a warning haptic signal in the brake pedal when the controller concludes that the operation duration of the brake pedal is greater than or equal to the predetermined time period in the determining of whether the operation duration of the brake pedal is greater than or equal to the predetermined time period, wherein a logic after the generating of the warning haptic signal is fed back to the determining of whether the manual driving mode signal is generated.

2. The control method of claim 1, wherein, when the controller concludes that the operation duration of the brake pedal is less than the predetermined time period in the determining of whether the operation duration of the brake pedal is greater than or equal to the predetermined time period, performing the continuously maintaining the current autonomous driving mode to continuously maintain the autonomous driving mode.

3. The control method of claim 1, further including:

determining, by the controller, whether the brake pedal operation signal is generated when the controller concludes that the manual driving mode signal is generated in the determining of whether the manual driving mode signal is generated; and switching to the manual driving mode when the controller concludes that the brake pedal operation signal is generated in the determining of whether the brake pedal operation signal is generated.

4. The control method of claim 3, wherein, when the controller concludes that the brake pedal operation signal is not generated in the determining of whether the brake pedal operation signal is generated, performing the continuously maintaining the current autonomous driving mode to continuously maintain the autonomous driving mode.

5. The control method of claim 3, further including generating a welcome haptic signal in the brake pedal before the switching to the manual driving mode, wherein the switching to the manual driving mode is performed after the welcome haptic signal is generated.

6. The control method of claim 5, wherein an accelerator pedal haptic signal or a brake pedal haptic signal is generated when the controller receives operation signal of an accelerator pedal of the vehicle or the brake pedal in a manual driving mode situation of the vehicle after the switching to the manual driving mode.

7. The control method of claim 6, wherein signal strength of each of the accelerator pedal haptic signal and the brake pedal haptic signal increases according to an amount of operation of the accelerator pedal and the brake pedal.

8. The control method of claim 6, wherein the warning haptic signal, the welcome haptic signal, the accelerator pedal haptic signal, and the brake pedal haptic signal have different signal types and strengths.

9. A non-transitory computer readable storage medium on which a program for performing the method of claim 1 is recorded.

* * * * *